(12) United States Patent
Kudoh et al.

(10) Patent No.: US 9,972,862 B2
(45) Date of Patent: *May 15, 2018

(54) SECONDARY BATTERY

(71) Applicants: KABUSHIKI KAISHA NIHON MICRONICS, Tokyo (JP); GUALA TECHNOLOGY CO., LTD., Hyogo-Ken (JP)

(72) Inventors: Takuo Kudoh, Tokyo (JP); Kiyoyasu Hiwada, Tokyo (JP); Shozo Izumo, Tokyo (JP); Tomokazu Saito, Tokyo (JP); Akira Nakazawa, Hyogo-Ken (JP)

(73) Assignees: KABUSHIKI KAISHA NIHON MICRONICS, Tokyo (JP); GUALA TECHNOLOGY CO., LTD., Hyogo-Ken (JP)

( * ) Notice: Subject to any disclaimer, the term of this patent is extended or adjusted under 35 U.S.C. 154(b) by 166 days.

This patent is subject to a terminal disclaimer.

(21) Appl. No.: 14/395,316

(22) PCT Filed: Apr. 25, 2013

(86) PCT No.: PCT/JP2013/062178
§ 371 (c)(1),
(2) Date: Oct. 17, 2014

(87) PCT Pub. No.: WO2013/161926
PCT Pub. Date: Oct. 31, 2013

(65) Prior Publication Data
US 2015/0072231 A1 Mar. 12, 2015

(30) Foreign Application Priority Data
Apr. 27, 2012 (JP) .................................. 2012/061357

(51) Int. Cl.
*H01M 10/04* (2006.01)
*H01M 2/26* (2006.01)
(Continued)

(52) U.S. Cl.
CPC ....... *H01M 10/0431* (2013.01); *H01M 2/263* (2013.01); *H01M 10/045* (2013.01);
(Continued)

(58) Field of Classification Search
None
See application file for complete search history.

(56) References Cited

U.S. PATENT DOCUMENTS 5,460,904 A 10/1995 Gozdz et al.
5,498,489 A 3/1996 Dasgupta et al.
(Continued)

FOREIGN PATENT DOCUMENTS

EP 1113511 A1 4/2001
JP 06-290780 10/1994
(Continued)

OTHER PUBLICATIONS

Nickel-Metal Hydride Battery, p. 319, 1.26-39;Battery Handbook, Edited by the Committee of Battery Technology in the Electrochemical Society of Japan; Translations of International Search Report in PCT/JP2013/062178 Application.
(Continued)

*Primary Examiner* — Wojciech Haske
(74) *Attorney, Agent, or Firm* — Bacon & Thomas, PLLC

(57) ABSTRACT

Provided is a secondary battery in which a single-layer secondary cell has an all-solid-state secondary cell structure with a storage layer sandwiched between a positive electrode layer and a negative electrode layer and which is superior to a conventional secondary battery with respect to at least one of volume, operation, and positioning. The
(Continued)

present invention provides a secondary battery including a folded single-layer secondary cell formed by folding a sheet-shaped single-layer secondary cell, with a storage layer sandwiched between a positive electrode layer and a negative electrode layer, two or more times while alternately reversing the folding direction.

6 Claims, 16 Drawing Sheets

(51) Int. Cl.
*H01M 10/0525* (2010.01)
*H01M 10/0583* (2010.01)
*H01M 10/0562* (2010.01)

(52) U.S. Cl.
CPC ... *H01M 10/0454* (2013.01); *H01M 10/0459* (2013.01); *H01M 10/0525* (2013.01); *H01M 10/0562* (2013.01); *H01M 10/0583* (2013.01)

(56) References Cited

U.S. PATENT DOCUMENTS

| | | | | |
|---|---|---|---|---|
| 5,925,482 A * | 7/1999 | Yamashita | ............... | H01M 2/34 429/130 |
| 6,277,516 B1 * | 8/2001 | Sasaki | ................ | H01M 2/0275 29/623.2 |
| 6,444,354 B1 | 9/2002 | Warren | | |
| 2004/0142235 A1 * | 7/2004 | Parsian | .................. | H01M 4/64 429/128 |
| 2005/0175902 A1 * | 8/2005 | Parsian | ............... | H01M 2/1673 429/241 |
| 2008/0176133 A1 * | 7/2008 | Hirose | .................... | H01M 4/04 429/164 |
| 2009/0053592 A1 | 2/2009 | Mino et al. | | |
| 2009/0081551 A1 * | 3/2009 | Hoshina | ................ | H01M 4/131 429/231.95 |
| 2010/0067089 A1 | 3/2010 | Nakazawa | | |
| 2011/0177370 A1 * | 7/2011 | Kawamoto | ........... | H01M 4/667 429/94 |
| 2013/0224596 A1 | 8/2013 | Nakazawa | | |

FOREIGN PATENT DOCUMENTS

| | | |
|---|---|---|
| JP | 10-302828 | 11/1998 |
| JP | 11-097065 | 4/1999 |
| JP | 2002-042855 | 2/2002 |
| JP | 2003-092144 A | 3/2003 |
| JP | 2009-140707 | 6/2009 |
| TW | M352782 | 3/2009 |
| WO | WO 9407276 A1 | 3/1994 |
| WO | WO2008053561 A1 | 5/2008 |
| WO | WO2012/046325 A1 | 4/2012 |

OTHER PUBLICATIONS

Supplementary Extended European Search Report dated Nov. 13, 2015 in Corresponding European Patent Application No. 13781594.0.

* cited by examiner

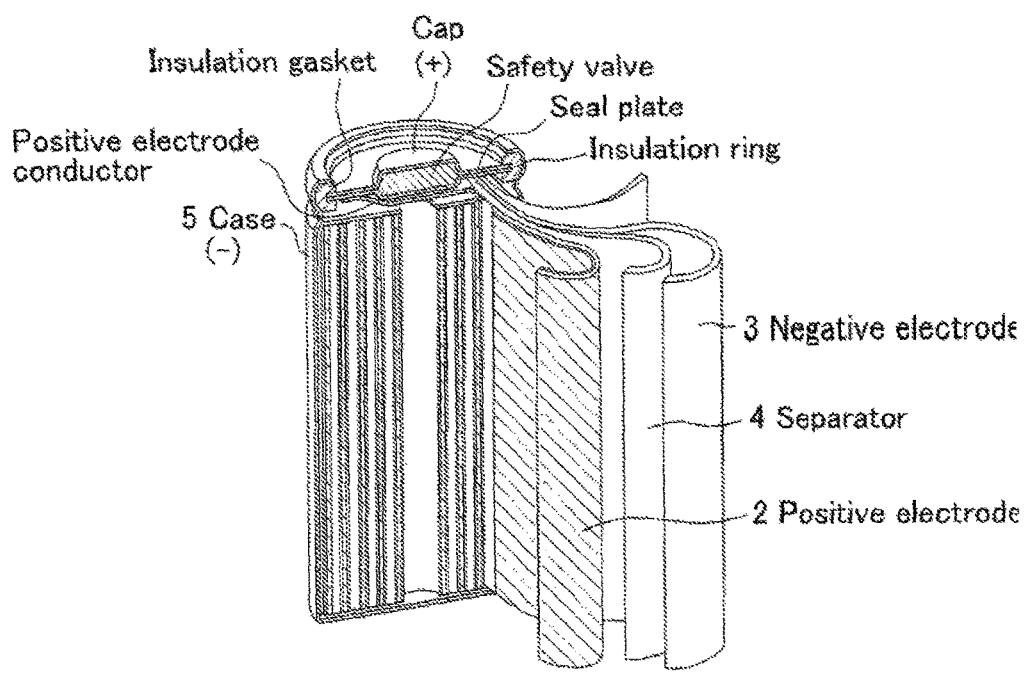
(Prior Art) FIG.1
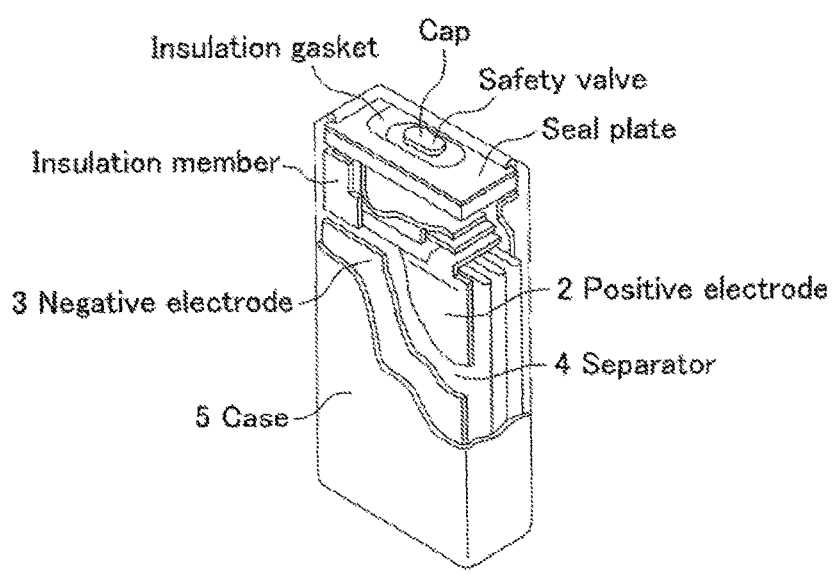
(Prior Art) FIG.2

SECONDARY BATTERY

TECHNICAL FIELD

The present invention relates to a secondary battery, and for example, relates to a secondary battery (hereinafter, called a quantum battery) based on an operational principle of forming a new energy level in a band gap and capturing an electron by utilizing a photoexcited structural change of a metal oxide.

BACKGROUND ART

There have been known nickel-metal hydride (Ni-MH) batteries, lithium ion secondary batteries (LIB), and the like as secondary batteries. Recently, there is a need for small and high-capacity batteries. Accordingly, in some cases, a plurality of units (hereinafter, called single-layer cells) each functioning as a secondary cell are superposed.

Structures of a cylindrical type and a rectangular type of nickel-metal hydride (Ni-MH) batteries as illustrated in FIGS. 1 and 2 are disclosed on pages 319-320 in Non-Patent Document 1. A cylindrical type battery 1A is completed as a battery by winding a positive electrode 2 and a negative electrode 3 each being thin-plate-shaped to have a predetermined shape in whorl via a separator 4 (the whorl being perceived as superposed single-layer cells), inserting the whorl into a cylindrical case 5, and performing sealing after an electrolyte is poured therein. A rectangular battery 1B is completed as a battery by layering structures each having a separator 4 between a positive electrode 2 and a negative electrode 3 each being thin-plate-shaped to have a predetermined shape, inserting the structures into a rectangular case 5, and performing sealing after an electrolyte is poured therein.

In Patent Document 1, there is disclosed an internal structure (electrode plate group) of a rectangular lithium ion secondary battery as illustrated in FIG. 3. In the electrode plate group 1C, positive electrode plates 2 and negative electrode plates 3 are alternately inserted to valley grooves of a continuous body of a zigzag-folded separator 4 and flattened by being pressed in a zigzag direction. Such an electrode plate group is inserted into a rectangular external enclosure and sealing is performed after an electrolyte is poured therein to complete a rectangular battery.

Further, recently, all-solid-state secondary cells structured with solid thin films have been researched and developed as being expected to actualize downsized secondary cells. FIG. 4 is a perspective view and a sectional view illustrating a structure of an all-solid-state secondary cell. In FIG. 4, terminal members such as a positive electrode terminal and a negative electrode terminal, mounting members such as an external member and a cover member, and the like are not illustrated. An all-solid-state secondary cell 1D includes a solid layer (hereinafter, called a storage layer) 6 in which internal change occurs during charging and discharging between a negative electrode layer 3 and a positive electrode layer 2. Examples of the all-solid-state secondary cell 1D include a quantum cell described above and an all-solid-state lithium ion secondary cell. In a case of a quantum cell, a layer (called a charging layer as described later) to store (capture) electrons with a charging operation and to release the charged electrons with a discharging operation is arranged between the negative electrode layer 3 and the positive electrode layer 2. The charging layer corresponds to the storage layer 6. In a case of the all-solid-state lithium ion secondary cell, a solid electrolyte layer is arranged between the negative electrode layer 3 and the positive electrode layer 2. The solid electrolyte layer corresponds to the storage layer 6. Here, in a case that the structure illustrated in FIG. 4 is to be layered as a single-layer cell, it is preferable that a seal 7 is arranged around the storage layer 6 and the like for providing insulation between the negative electrode layer 3 and the positive electrode layer 2 and for protecting the periphery of the storage layer 6. Here, the seal 7 is not an essential structural element.

As is widely known, regarding the all-solid-state secondary cell 1D as well, terminal voltage can be heightened by layering single-layer cells in series and current capacity can be increased by layering single-layer cells in parallel.

FIG. 5 is a sectional view illustrating an easily-anticipatable secondary battery 1E in which a plurality of single-layer cells are serial-connected with each single-layer cell being the secondary cell 1D. In the secondary battery 1E, a lower face of the negative electrode layer 3 of an intermediate single-layer cell 1D is in contact with an upper face of the positive electrode layer 2 of a single-layer cell at the one-stage lower side therefrom. A lower face of the negative electrode layer 3 of a single-layer cell at the lowermost stage is in contact with an upper face of a negative electrode terminal plate or a negative electrode terminal layer (hereinafter, called a negative electrode terminal plate) 8. An upper face of the positive electrode layer 2 of a single-layer cell at the uppermost stage is in contact with an upper face of a positive electrode terminal plate or a positive electrode terminal layer (hereinafter, called a positive electrode terminal plate) 9. The negative electrode terminal plate 8 and the positive electrode terminal plate 9 include extension portions 8a, 9a, respectively, for exposing the negative electrode terminal and the positive electrode terminal to the outside of a mounting member (not illustrated). Assuming that the secondary cell 1D has terminal voltage $V_0$ and current capacity $I_0$ (=I×t (Ah)), and the number (serial-connected number) of layers of the secondary cells 1D is N, terminal voltage of the secondary battery 1E becomes to N×$V_0$ (e.g., 6$V_0$ if the number of layers is six) while current capacity $I_0$ thereof remains at $I_0$.

FIG. 6 is a sectional view illustrating an easily-anticipatable secondary battery 1F in which a plurality of single-layer cells are parallel-connected with each single-layer cell being the secondary cell 1D. In the secondary battery 1F, each single-layer cell 1D is sandwiched between the negative electrode terminal plate 8 and the positive electrode terminal plate 9, and further, an insulation layer 10 is arranged between the positive electrode terminal plate 9 of a single-layer cell and the negative electrode terminal plate 8 of a single-layer cell at the one-stage upper side therefrom. A plurality of the negative electrode terminal plates 8 are connected by a negative electrode terminal connection portion 8b and a plurality of the positive electrode terminal plates 9 are connected by a positive electrode terminal connection portion 9b. The negative electrode terminal connection portion 8b and the positive electrode terminal connection portion 9b include extension portions 8a, 9a, respectively, for exposing the negative electrode terminal and the positive electrode terminal to the outside of a mounting member (not illustrated). Assuming that the secondary cell 1D has terminal voltage $V_0$ and current capacity $I_0$, and the number (parallel-connected number) of layers of the secondary cells 1D is N, capacity of the secondary battery 1F becomes to N×$I_0$ (e.g., 6$I_0$ if the number of layers is six) while terminal voltage thereof remains at $V_0$.

To actualize a secondary battery having high terminal voltage and large current capacity, single-layer cells are simply required to be arranged in combination of a multi-layer in serial connection and a multi layer in parallel connection. Here, for example, owing to that a single-layer cell 1D sandwiched between the negative electrode terminal plate 8 and the positive electrode terminal plate 9 in FIG. 6 is replaced with a multilayer of a plurality of single-layer cells in serial connection, it is possible to structure a secondary battery having higher terminal voltage and larger current capacity.

CITED DOCUMENT

Patent Document

Patent Document 1: Japanese Patent Application Laid-Open No. 2009-140707

Non-Patent Document

Non-Patent Document 1: Committee of Battery Technology in Electrochemical Society (February 2010): Battery handbook. Ormsha, Ltd.

SUMMARY OF THE INVENTION

In the conventional secondary battery illustrated in FIGS. 1 to 3, it is required to arrange a separator for providing insulation between a positive electrode and a negative electrode of adjacent single-layer cells and to ensure accommodation space for an electrolyte. Accordingly, it has been difficult to reduce whole volume of the secondary battery. In the secondary battery illustrated in FIGS. 1 to 3, since chemical reaction is utilized, deterioration of charging/discharging performance and reduction of lifetime may be caused. Further, since an electrolyte is used, there may be a risk of fluid leakage. Furthermore, in a lithium ion secondary battery, there is a fear of reliability degradation due to overcharging and charging/discharging, and short-circuit occurrence between electrodes due to usage of an electrolyte.

Most of problems caused by using an electrolyte can be solved by using an all-solid-state secondary cell.

As described above, current capacity of a secondary battery can be increased by parallel-connecting a plurality of single-layer cells. However, in the secondary battery 1F as illustrated in FIG. 6, it is required to arrange an insulation layer 10 between the negative electrode terminal plate 8 and the positive electrode terminal plate 9 of adjacent single-layer cells. Further, it is required to arrange the negative electrode terminal plates 8 as the same number of the negative electrode layers 3 of the single-layer cell and to arrange the positive electrode terminal plates 9 as the same number of the positive electrode layers 2 of the single-layer cell. Accordingly, volume of the secondary battery 1F is increased.

In general, volume efficiency of a battery is obtained as a ratio of effective volume of the battery to whole volume of the battery. In consideration of cycles of charging a secondary battery, it is required for the secondary battery to have large current capacity. Here, it is preferable that whole volume of the battery is small even though current capacity is increased. Further, reduction of whole volume of the battery contributes to downsizing of the secondary battery. Here, the negative electrode terminal plates 8 and the positive electrode terminal plates 9 are necessary for structuring a battery. However, the insulation layers 10 are arranged reluctantly. This is a major cause to decrease volume efficiency.

It is possible to increase the number of layers of single-layer cells in parallel connection in accordance with increase of desired current capacity. However, the number of the insulation layers 10 is increased (as well as the number of the negative electrode terminal plates 8 and the positive electrode terminal plates 9) in accordance with increase of the number of layers. As a result, whole volume is further increased.

In either parallel connection or serial connection, a secondary battery in which a plurality of single-layer cells are layered has high requirements for positioning of the respective single-layer cells. In a case of the secondary battery 1F illustrated in FIG. 6, it is preferable, from a viewpoint of reducing whole volume, that the negative electrode terminal connection portions 8b and the positive electrode terminal connection portions 9b are arranged closer to the single-layer cells 1D (i.e., a gap L in FIG. 6 is smaller). For example, if any of the single-layer cells is layered as being shifted rightward in FIG. 6 and the negative electrode layer 3 of the single-layer cell is contacted to the positive electrode terminal connection portion 9b, a short-circuit is formed thereat. Thus, the respective single-layer cells have high requirements for positioning. Accordingly, there may be a possibility to cause decrease of manufacturing efficiency.

Further, owing to that single-layer cells as the number of layers have to be layered in a layering process, there has been large workload for manufacturing.

In such a situation, there has been desired a secondary battery in which a single-layer secondary cell has an all-solid-state secondary cell structure with a storage layer sandwiched between a positive electrode layer and a negative electrode layer and which is superior to a conventional secondary battery with respect to at least one of volume, manufacturing, and positioning.

To solve such problems, a secondary battery of the present invention includes a folded single-layer secondary cell formed by folding a sheet-shaped shingle-layer secondary cell, with a storage layer sandwiched between a positive electrode layer and a negative electrode layer, two or more times while alternately reversing the folding direction.

The present invention adopts a folded single-layer secondary cell formed by folding a sheet-shaped single-layer secondary cell two or more times while alternately reversing the folding direction. Accordingly, it is possible to achieve any of effects such that volume can be suppressed by eliminating or lessening insulation layers, a component count can be reduced and manufacturing efficiency can be improved, and positioning accuracy can be improved with a positive electrode terminal member or a negative electrode terminal member inserted to a folding internal gap.

BRIEF DESCRIPTION OF THE DRAWINGS

FIG. 1 is a perspective view illustrating an internal structure of a conventional cylindrical nickel-metal hydride (Ni-MH) battery with a part thereof broken.

FIG. 2 is a perspective view illustrating an internal structure of a conventional rectangular nickel-metal hydride (Ni-MH) battery with a part thereof broken.

EMBODIMENTS OF THE INVENTION (A) Quantum Cell

A secondary battery of each embodiment described in the following adopts a quantum cell technology. Here, brief description will be provided on a quantum cell before describing the respective embodiments.

As described above, a quantum cell is a secondary cell based on an operational principal of forming a new energy level in a band gap and capturing an electron by utilizing a photoexcited structural change of a metal oxide.

Figure 3:
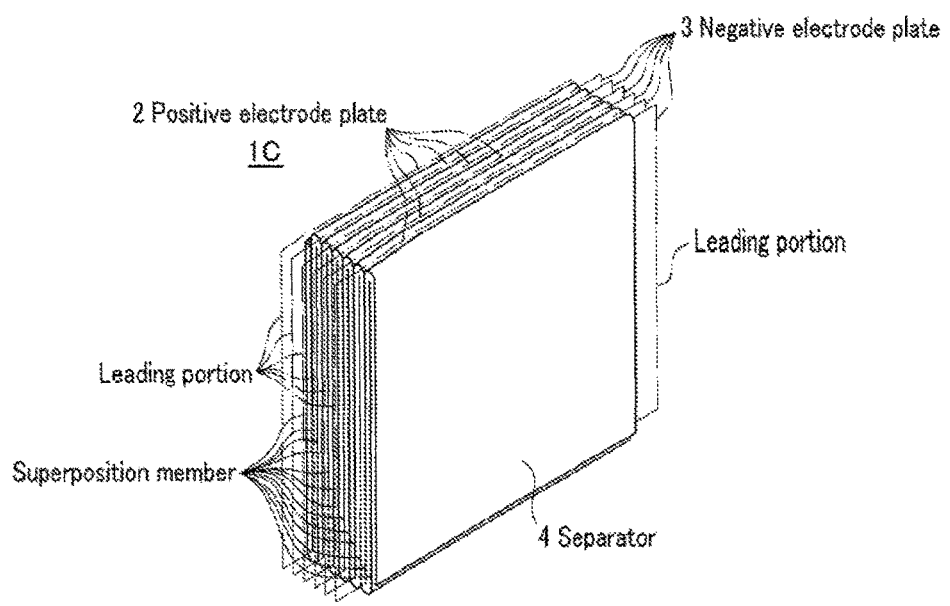
FIG. 3 is a perspective view illustrating an internal structure (electrode plate groups) of a rectangular lithium ion secondary battery disclosed in Patent Document 1.
Figure 4:
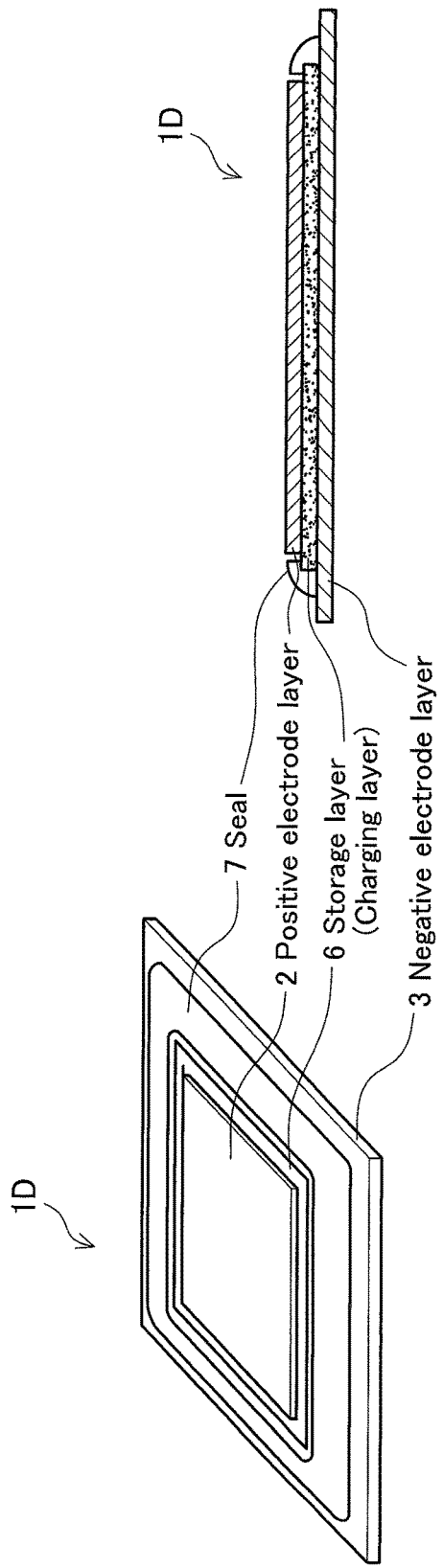
FIG. 4 is a perspective view and a sectional view illustrating a structure of an all-solid-state secondary cell.
Figure 5:
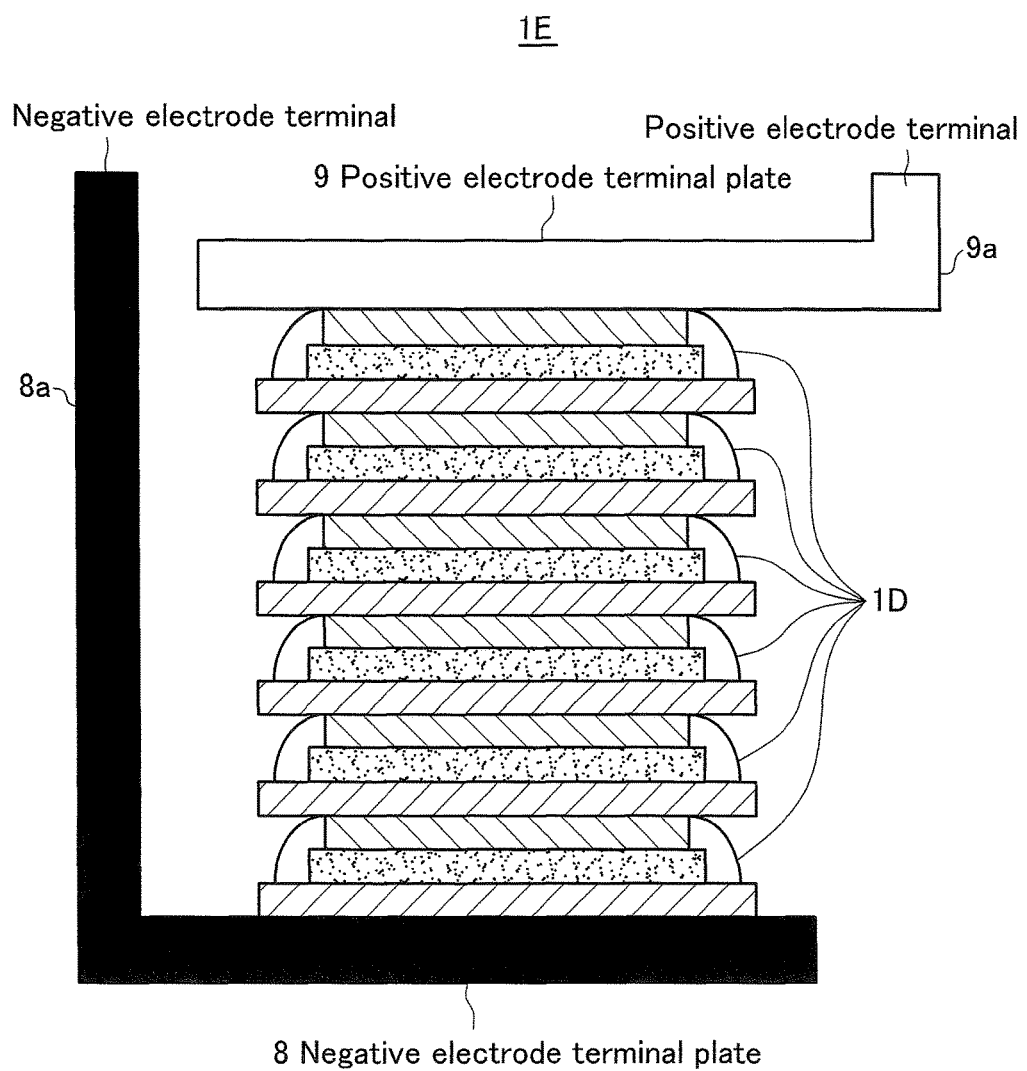
FIG. 5 is a sectional view illustrating an anticipatable structure of a secondary battery in which a plurality of single-layer cells are serial-connected with each single-layer cell being an all-solid-state secondary cell.

The quantum cell is an all-solid-state secondary cell. FIG. 4 illustrates a structure capable of solely functioning as a secondary cell. That is, the quantum cell 1D has a charging layer 6 between a negative electrode layer 3 and a positive electrode layer 2.

The charging layer 6 is a layer to store electrons with a charging operation, to release the charged electrons with a discharging operation, and to keep the electrons (perform storage of electricity) in a state without charging/discharging. The charging layer 6 is formed by applying a photoexcited structural change technology.

The photoexcited structural change is described, for example, in International Patent Application Laid-open No. WO/2008/053561 and is a phenomenon (technology) found by Akira Nakazawa, who is an inventor of the above application as well as the present application. That is, Akira Nakazawa found out that, when effective excitation energy is applied to an insulation-coated translucent metal oxide which is a semiconductor having a band gap at a predetermined value or higher, a number of energy levels with no electron are generated in the band gap. The quantum cell is charged by being caused to capture electrons in these energy levels and discharged by being caused to release the captured electrons.

The charging layer 6 is formed in a way where insulation-coated n-type metal oxide semiconductor particles adhere to the negative electrode layer 3 in a thin film shape and is transformed to be capable of storing electrons with a photoexcited structural change caused at the n-type metal oxide semiconductor by ultraviolet irradiation.

In the quantum cell, the positive electrode layer 2 includes an electrode main body layer and a p-type metal oxide semiconductor layer formed to be in contact with the charging layer 6. The p-type metal oxide semiconductor layer is arranged so that electrons are prevented from being injected from the electrode main body layer to the charging layer 6. The negative electrode layer 3 and the electrode main body layer of the positive electrode layer 2 are simply required to be formed as conductive layers.

A secondary battery of each embodiment described in the following is formed by using one or a plurality of units (hereinafter, called single-layer quantum cells), each solely functioning as a quantum cell illustrated in FIG. 4. The respective embodiments commonly adopt a technical idea that a single-layer quantum cell is used as being folded two or more times while alternately changing the folding direction. Therefore, the single-layer quantum cell is formed to have a length being approximately folding times of a length required in the folding direction. The shape thereof is preferably rectangular but is not limited to a rectangle. It is also possible to have a shape obtained by connecting unit shapes in the folding direction, each unit being a circle, an ellipse, a hexagon, or the like. Here, it is preferable that the single-layer quantum cell is shaped so that the respective folded portions after being folded are completely overlapped. However, it is not limited thereto.

For example, the positive electrode layer 2 and the negative electrode layer 3 of the single-layer quantum cell may have a thickness approximately in a range between 10 nm and 1 μm and the charging layer 6 may have a thickness approximately in a range between 50 nm and 10 μm. Thus, the single-layer quantum cell is a sheet-shaped cell as being capable of being folded two or more times. Here, the charging layer 6 is an all-solid layer but not a layer in which particles are packed. Accordingly, damages and cracking are prevented from occurring at bent sections.

As described above with reference to FIG. 4, the seal 7 is not necessarily required to be arranged in the single-layer quantum cell as well. As long as an unnecessary short-circuit such as a short-circuit between the negative electrode layer 3 and the positive electrode layer 2 can be prevented with a gap and the like after being folded, the seal 7 can be eliminated.

(B) First Embodiment

Figure 7:
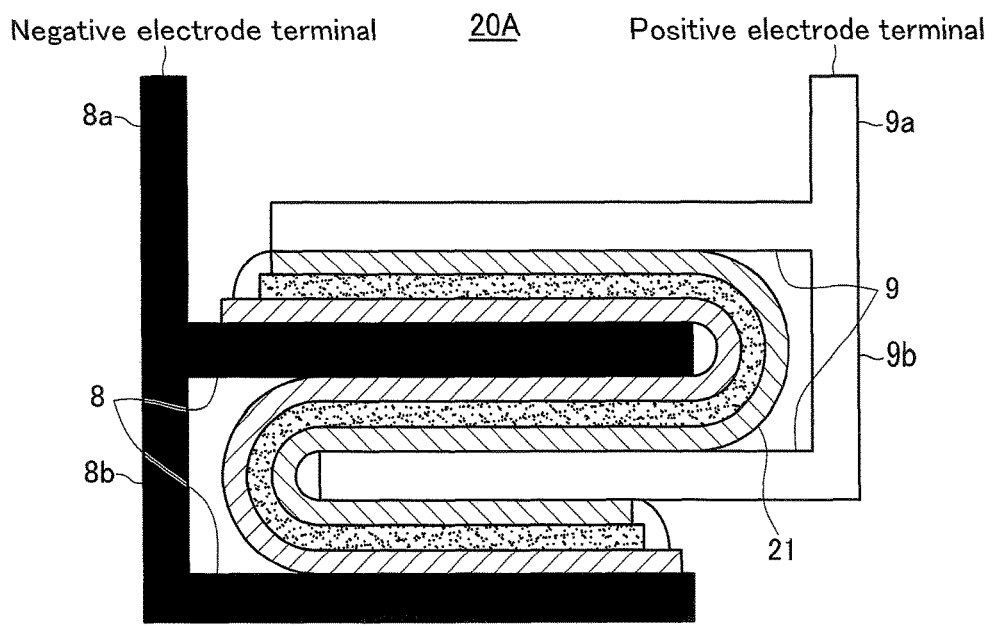
FIG. 7 is a sectional view illustrating a structure of a first secondary battery of a first embodiment.

Next, a first embodiment of a secondary battery of the present invention will be described with reference to the drawings. FIG. 7 is a sectional view illustrating a structure of a secondary battery 20A according to the first embodiment as viewing from the same direction as FIG. 4(B). In FIG. 7, dimensions in the thickness direction are more emphasized than those in the planar direction.

The secondary battery 20A according to the first embodiment includes a single-layer quantum cell (hereinafter, appropriately called a folded single-layer quantum cell) 21 which is folded two or more times (FIG. 7 illustrates an example of two times). In the folded single-layer quantum cell 21, folding is performed at an odd-numbered bent section from the lower side with the positive electrode layer 2 being at the inner side and folding is performed at an even-numbered bent section with the negative electrode layer 3 being at the inner side. Thus, the folded single-layer quantum cell 21 has an accordion structure with the folding direction changed alternately. The shape of the single-layer quantum cell before being folded may be determined in accordance with desired current capacity, and then, the number of folding times of the single-layer quantum cell may be determined in consideration of a mounting shape, and the like.

A positive electrode terminal plate 9 is inserted to a space between an upper part and a lower part of the positive electrode layer 2 mutually faced due to folding of the single-layer quantum cell until the leading end thereof is contacted to the inner face of the bent section. A positive electrode terminal plate 9 is in contact with the positive electrode layer 2 exposed to the outside of the folded single-layer quantum cell 21 (such a positive electrode layer 2 does not exist in FIG. 8 described later). All of the positive electrode terminal plates 9 are mutually connected by a positive electrode terminal connection portion 9b. A negative electrode terminal plate 8 is inserted to a space between an upper part and a lower part of the negative electrode layer 3 mutually faced due to folding of the single-layer quantum cell until the leading end thereof is contacted to the inner face of the bent section. A negative electrode terminal plate 8 is in contact with the negative electrode layer 3 exposed to the outside of the folded single-layer quantum cell 21. All of the negative electrode terminal plates 8 are mutually connected by a negative electrode terminal connection portion 8b. Here, it is also possible to eliminate some of the negative electrode terminal plates 8 and some of the positive electrode terminal plates 9 illustrated in FIG. 7. For example, in FIG. 7, it is possible to eliminate the positive electrode terminal plate 9 at the uppermost position and the negative electrode terminal plate 8 at the lowermost position. In contrast, while the positive electrode terminal plate 9 and the negative electrode terminal plate 8 described above are kept arranged thereat, another positive electrode terminal plate 9 and another negative electrode terminal plate 8 may be eliminated.

Here, being called "plates", the negative electrode terminal plates 8 and the positive electrode terminal plates 9 may be formed in a thin film shape as well as a thin plate shape. Further, not being required that the entire face thereof contributes to electrical connection, the negative electrode terminal plates 8 and the positive electrode terminal plates 9 may be formed in a mesh shape, a comb shape, or the like in which a conductive section is partially eliminated.

The negative electrode terminal connection portion 8b and the positive electrode terminal connection portion 9b include extension portions 8a, 9a respectively for exposing the negative electrode terminal and the positive electrode terminal to the outside of a mounting member (not illustrated). In FIG. 7, the negative electrode terminal connection portion 8b and the positive electrode terminal connection portion 9b are arranged at lateral sides. However, the negative electrode terminal connection portion 8b and the positive electrode terminal connection portion 9b may be located in an arbitrary manner. For example, it is also possible that the negative electrode terminal connection portion 8b and the positive electrode terminal connection portion 9b are arranged at the near side and the far side in the normal direction of the depiction of the drawing. Alternatively, it is also possible that the negative electrode terminal connection portion 8b is arranged at the left side and the positive electrode terminal connection portion 9b is arranged at the near side in the normal direction of the depiction of the drawing. Further, the negative electrode terminal connection portion 8b and the positive electrode terminal connection portion 9b may be plate-shaped or rod-shaped. Further, not limited to a single member, a plurality of members therefor may be aligned in the normal direction of the depiction of the drawing.

Further, in FIG. 7, the negative electrode terminal plates 8, the extension portion 8a, and the negative electrode terminal connection portion 8b are integrally formed, while the positive electrode terminal plates 9, the extension portion 9a, and the positive electrode terminal connection portion 9b are integrally formed. However, it is not required to be formed integrally from the beginning. For example, it is also possible that the negative electrode terminal plates 8, the extension portion 8a, and the negative electrode terminal connection portion 8b are structured as separate members and connected in a manufacturing process.

As long as the negative electrode terminal plates 8, the extension portion 8a, and the negative electrode terminal connection portion 8b can be connected to the negative electrode layer 3 and the external negative electrode terminal (not illustrated) as having a sufficiently-low electrical resistance value, shapes and materials thereof are not limited. Similarly, as long as the positive electrode terminal plates 9, the extension portion 9a, and the positive electrode terminal connection portion 9b can be connected to the positive electrode layer 2 and the external positive electrode terminal (not illustrated) as having a sufficiently-low electrical resistance value, shapes and materials thereof are not limited.

The secondary battery 20A according to the first embodiment adopts the folded single-layer quantum cell 21. Accordingly, when area viewed from the planar direction is the same as that of a single-layer quantum cell, current capacity can be remarkably increased.

Further, the secondary battery 20A according to the first embodiment adopts a folded structure with the folding direction changed alternately. Accordingly, an insulation layer for ensuring insulation between the positive electrode and the negative electrode is not required to be arranged and whole volume can be reduced.

Figure 6:
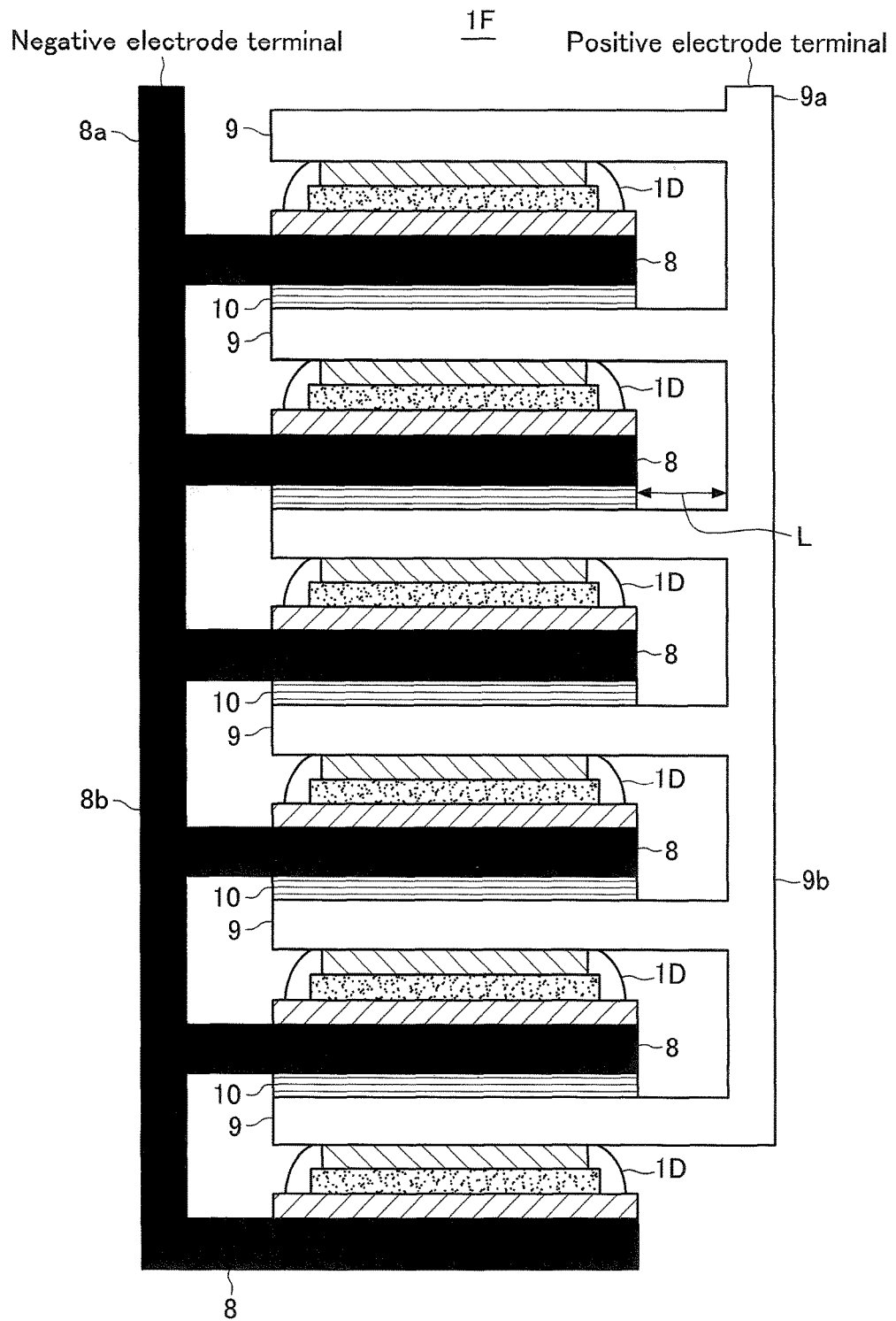
FIG. 6 is a sectional view illustrating an anticipatable structure of a secondary battery in which a plurality of single-layer cells are parallel-connected with each single-layer cell being an all-solid-state secondary cell.

Further, since the single-layer quantum cell is used in a folded state, area occupied by the secondary cell 20A can be reduced. For example, compared to a case that the single-layer cell has similar area to that of the secondary battery 1F illustrated in FIG. 6, area occupied by the secondary battery 20A can be reduced approximately to one third of the secondary battery 1F Further, since the single-layer quantum cell is used in a folded state, a component count of members to be layered can be reduced and workload of layering processes can be reduced. For example, even when the secondary battery 20A is formed to have approximately the same thickness as that of the secondary battery 1F illustrated in FIG. 6, only one folded single-layer quantum cell 21 is required.

Further, some of the negative electrode terminal plates 8 and the positive electrode terminal plates 9 are inserted until each leading end thereof is contacted to the inner face of the bent section of the folded single-layer quantum cell 21. Accordingly, positional variation of the folded single-layer quantum cell 21 can be eliminated and short-circuits and the like can be prevented.

In the folded single-layer quantum cell 21 of FIG. 7, folding is performed at an odd-numbered bent section from the lower side with the positive electrode layer 2 being at the inner side and folding is performed at an even-numbered bent section with the negative electrode layer 3 being at the inner side. However, modified examples of the secondary battery 20A of the first embodiment may include a structure to adopt a folded single-layer quantum cell in which folding is performed at an odd-numbered bent section from the lower side with the negative electrode layer 3 being at the inner side and folding is performed at an even-numbered bent section with the positive electrode layer 2 being at the inner side. The modified example corresponds to a structure that positive electrode elements in FIG. 7 are replaced with negative electrode elements and negative electrode elements in FIG. 7 are replaced with positive electrode elements.

In FIG. 7, the secondary battery 20A adopts one folded single-layer quantum cell 21. However, it is also possible to structure a secondary battery which adopts a plurality of the folded single-layer quantum cells 21. For example, it is also possible to increase current capacity by arranging two folded single-layer quantum cells 21 in the lateral direction. In this case, for example, the negative electrode terminal plates 8 are extended from the far side toward the near side in the width direction while the positive electrode terminal plates 9 are extended from the near side toward the far side in the width direction. Here, the extending direction is in parallel to the folding lines. The secondary battery 20A of the first embodiment adopting one folded single-layer quantum cell 21 whose number of folding times is twice as large as that of the folded single-layer quantum cell of the above modified embodiment can actualize approximately the same current capacity as well. Here, compared to the secondary battery 20A, the secondary battery of the modified embodiment can reduce thickness (length in the vertical direction) with a larger length in the lateral direction. Accordingly, it is simply required to determine which structure is to be adopted in accordance with intended use and the like.

A plurality of the secondary batteries 20A illustrated in FIG. 7 may be mounted in a single mounting member. In this case, the extension portions 8a, 9a of the plurality of secondary batteries 20A may be connected in series, connected in parallel, or connected in series-parallel. Alternatively, the extension portions 8a, 9a may be separately exposed to the outside. For example, two of the secondary batteries 20A may be mounted in amounting member so that the planar shape thereof is approximately circular, while the planar shape of each folded single-layer quantum cell 21 is semicircular.

Figure 8:
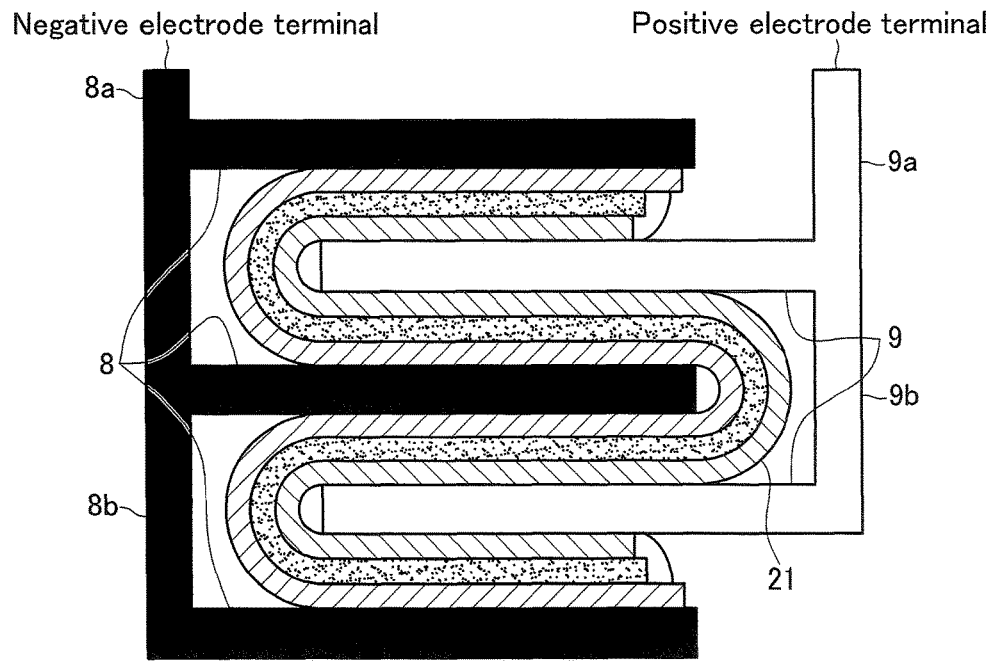
FIG. 8 is a sectional view illustrating a structure of a second secondary battery of the first embodiment.

In FIG. 7, the secondary battery 20A adopts the folded single-layer quantum cell 21 which is folded two times. FIG. 8 illustrates a secondary battery adopting the technical idea of the first embodiment in which the folded single-layer quantum cell 21 is folded three times. As described above, the number of folding times is simply required to be two or more. Detailed description on the secondary battery illustrated in FIG. 8 will be skipped.

(C) Second Embodiment

Figure 9:
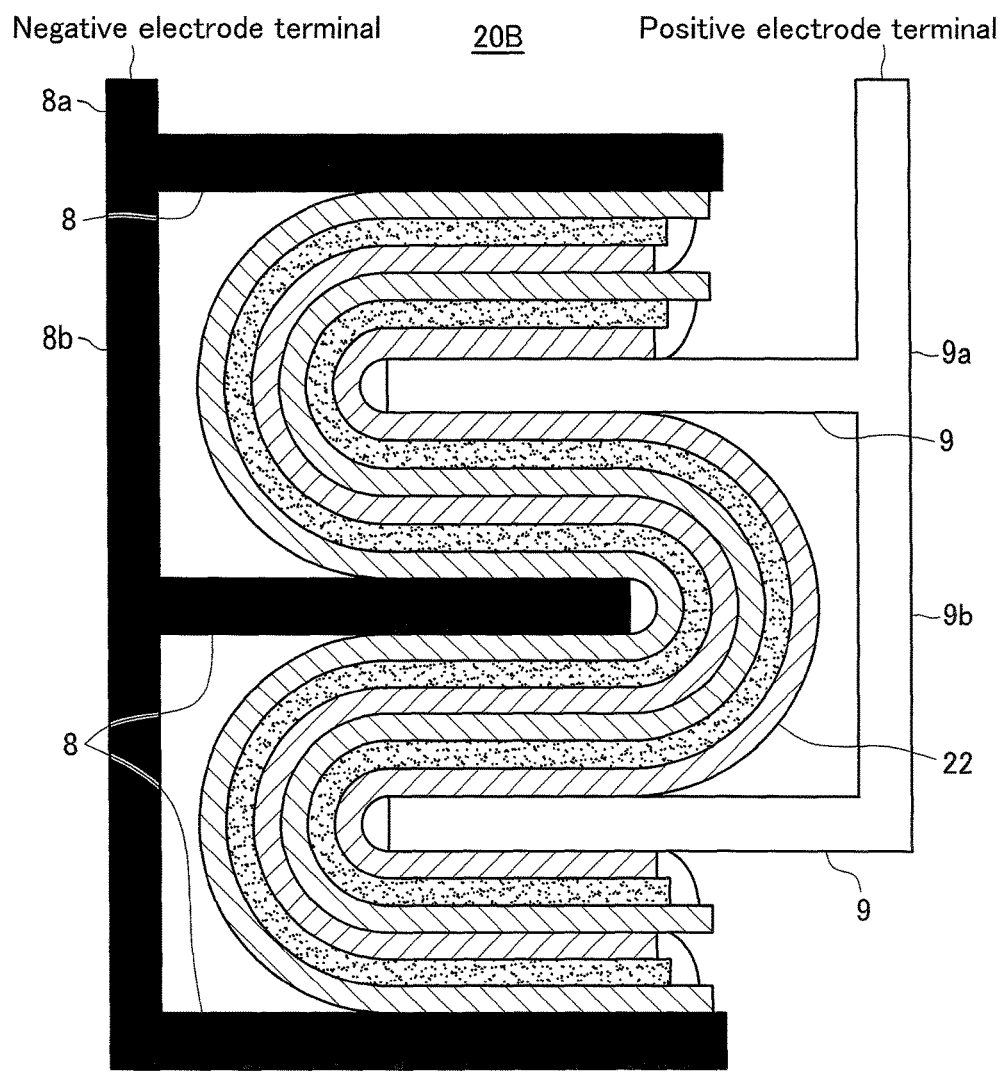
FIG. 9 is a sectional view illustrating a structure of a secondary battery of a second embodiment.

Next, a second embodiment of a secondary battery according to the present invention will be described with reference to the drawings. FIG. 9 is a sectional view illustrating a structure of a secondary battery 20B according to the second embodiment as viewing from the same direction as FIG. 4(B). In FIG. 9, dimensions in the thickness direction are more emphasized than those in the planar direction.

Figure 10:
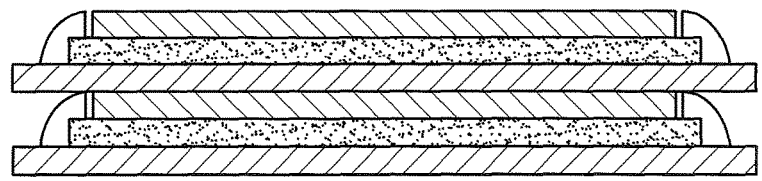
FIG. 10 is a sectional view illustrating a state that single-layer quantum cells are superposed into multi-stages before being folded for forming a folded multistage single-layer quantum cell according to the second embodiment.

As illustrated in FIG. 10, the secondary battery 20B according to the second embodiment has a cell structure (hereinafter, appropriately called a folded multistage single-layer quantum cell) 22 in which single-layer quantum cells are superposed into two stages with top and bottom of each cell oriented in the same direction (vertical direction) and are folded two or more times (FIG. 9 illustrates an example of three times) while alternately changing the folding direction in the two-stage superposed state. The number of stages which corresponds to the number of parallel connections may be three or more as well. In the folded multistage single-layer quantum cell 22, folding is performed at an odd-numbered bent section from the lower side with the positive electrode layer 2 of the upper-stage single-layer quantum cell being at the inner side and folding is performed at an even-numbered bent section with the negative electrode layer 3 of the lower-stage single-layer quantum cell being at the inner side. Thus, the folded multistage single-layer quantum cell 22 has an accordion structure with the folding direction changed alternately. The shape of the single-layer quantum cell before being folded may be determined in accordance with desired current capacity, and then, the number of folding times of the single-layer quantum cell may be determined in consideration of a mounting shape, and the like. Further, the number of stages of the single-layer quantum cells before being folded may be determined in accordance with desired terminal voltage.

The positive electrode terminal plate 9 is inserted to a space between an upper part and a lower part of the positive electrode layer 2 mutually faced due to folding until the leading end thereof is contacted to the inner face of the bent section. Here, in a case that the number of folding times is even, the folded multistage single-layer quantum cell 22 also has the positive electrode layer 2 exposed to the outside (not existing in FIG. 9; see FIG. 7) and the positive electrode terminal plate 9 is in contact with the externally-exposed positive electrode layer 2. All of the positive electrode terminal plates 9 are mutually connected by the positive electrode terminal connection portion 9b. The negative electrode terminal plate 8 is inserted to a space between an upper part and a lower part of the negative electrode layer 3 mutually faced due to folding of the single-layer quantum cell until the leading end thereof is contacted to the inner face of the bent section. Further, the negative electrode terminal plate 8 is in contact with the negative electrode layer 3 exposed to the outside of the folded multistage single-layer quantum cell 22. All of the negative electrode terminal plates 8 are mutually connected by the negative electrode terminal connection portion 8b. Here, it is also possible to eliminate some of the negative electrode terminal plates 8 and some of the positive electrode terminal plates 9 illustrated in FIG. 9. The negative electrode terminal connection portion 8*b* and the positive electrode terminal connection portion 9*b* include the extension portions 8*a*, 9*a* respectively for exposing the negative electrode terminal and the positive electrode terminal to the outside of a mounting member (not illustrated).

In the secondary battery 20B according to the second embodiment, since the folded multistage single-layer quantum cell 22 is structured with the serial-connected single-layer quantum cells, terminal voltage can be heightened. As is clear when being unfolded, the folded multistage single-layer quantum cell 22 adopts the single-layer quantum cells having large area. Accordingly, current capacity can be increased.

Further, similarly to the first embodiment, the secondary battery 20B according to the second embodiment produces effects such as reducing whole volume without requiring insulation layers, reducing occupied area as folding two or more times, reducing workload of layering processes as reducing a component count of members to be layered, and suppressing positional variation of the folded multistage single-layer quantum cell 22.

Figure 11:
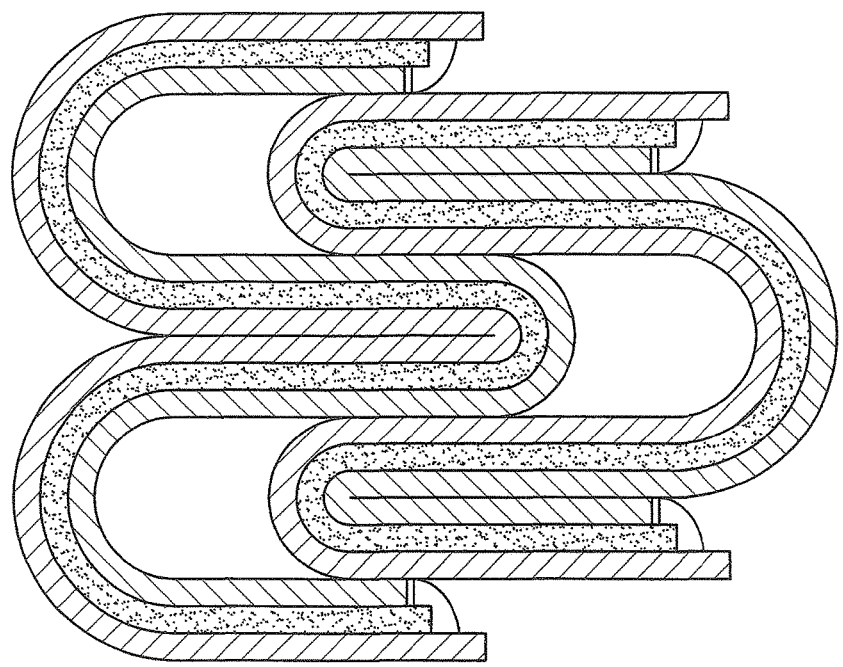
FIG. 11 is a sectional view illustrating a folded structure for each stage of the folded multistage single-layer quantum cell according to the second embodiment.

In the above description, the folded multistage single-layer quantum cell 22 is obtained by folding a plurality of the single-layer quantum cells two or more times while alternately changing the folding direction in a state that the single-layer quantum cells are superposed in a multistage manner. However, as illustrated in FIG. 11, it is also possible to obtain the folded multistage single-layer quantum cell 22 by fitting the folded single-layer quantum cells for the respective stages to each other after preparing the folded single-layer quantum cells for the respective stages.

As long as being capable of being applied to the secondary battery 20B of the second embodiment, the modified embodiments appropriately described for the secondary battery 20A of the first embodiment become to modified embodiments of the secondary battery 20B of the second embodiment. Here, detailed description thereof will not be repeated.

(D) Third Embodiment

Figure 12:
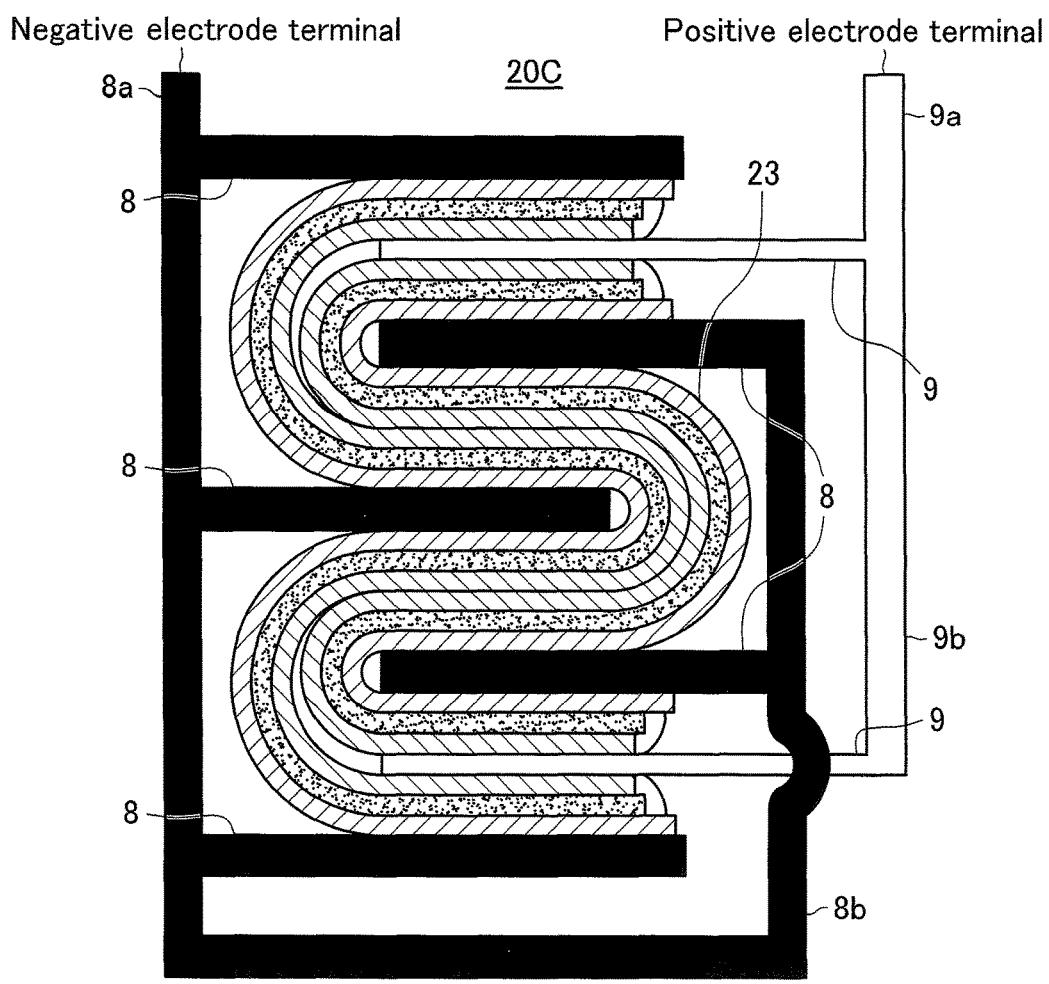
FIG. 12 is a sectional view illustrating a structure of a secondary battery of a third embodiment.

Next, a third embodiment of a secondary battery according to the present invention will be described with reference to the drawings. FIG. 12 is a sectional view illustrating a structure of a secondary battery 20C according to the third embodiment as viewing from the same direction as FIG. 4(B). In FIG. 12, dimensions in the thickness direction are more emphasized than those in the planer direction.

Figure 13:
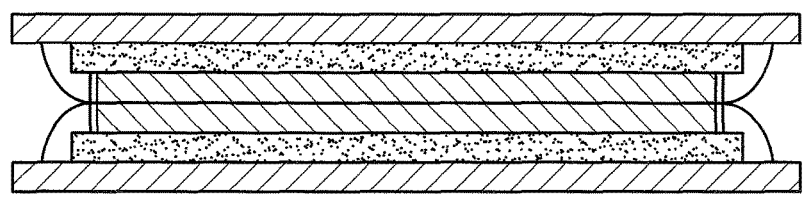
FIG. 13 is a sectional view illustrating a state that single-layer quantum cells are superposed into two stages before being folded for forming a folded two-stage single-layer quantum cell according to the third embodiment.

As illustrated in FIG. 13, the secondary battery 20C according to the third embodiment has a cell structure (hereinafter, appropriately called folded opposite-two-stage single-layer quantum cell) 23 in which two single-layer quantum cells are superposed into two stages with top and bottom of each cell oriented reversely (so that the positive electrode layers 2 are mutually contacted in an example of FIG. 13) and are folded two or more times (FIG. 12 illustrates an example of three times) while alternately changing the folding direction in a state of being superposed into two stages. In the folded opposite-two-stage single-layer quantum cell 23, folding is performed at an odd-numbered bent section from the lower side with the negative electrode layer 3 of the upper-stage single-layer quantum cell being at the inner side and folding is performed at an even-numbered bent section with the negative electrode layer 3 of the lower-stage single-layer quantum cell being at the inner side. Thus, the folded opposite-two-stage single-layer quantum cell 23 has an accordion structure with the folding direction changed alternately. The shape of the single-layer quantum cell before being folded may be determined in accordance with desired current capacity, and then, the number of folding times of the single-layer quantum cell may be determined in consideration of a mounting shape, and the like.

The positive electrode terminal plate 9 is inserted to a space between the contacting positive electrode layers 2 of the two single-layer quantum cells toward the bent section to which the positive electrode layer terminal plate 9 can reach linearly from an end of the folded opposite-two-stage single-layer quantum cell 23 until the leading end thereof is contacted to the inner face of the bent section. All of the positive electrode terminal plates 9 are mutually connected by the positive electrode terminal connection portion 9*b*. The negative electrode terminal plate 8 is inserted to a space between an upper part and a lower part of the negative electrode layer 3 mutually faced due to folding of the single-layer quantum cell until the leading end thereof is contacted to the inner face of the bent section. Further, the negative electrode terminal plate 8 is in contact with the negative electrode layer 3 exposed to the outside of the folded opposite-two-stage single-layer quantum cell 23. All of the negative electrode terminal plates 8 are mutually connected by the negative electrode terminal connection portion 8*b*. Here, it is also possible to eliminate some of the negative electrode terminal plates 8 and some of the positive electrode terminal plates 9 illustrated in FIG. 12. The negative electrode terminal connection portion 8*b* and the positive electrode terminal connection portion 9*b* include the extension portions 8*a*, 9*a* respectively for exposing the negative electrode terminal and the positive electrode terminal to the outside of a mounting member (not illustrated).

The secondary battery 20C according to the third embodiment includes the two single-layer quantum cells which are parallel-connected and the folded opposite-two-stage single-layer quantum cell 23 adopts the single-layer quantum cells having large area as is clear when being unfolded. Accordingly, current capacity can be increased.

Further, similarly to the first embodiment, the secondary battery 20C according to the third embodiment produces effects such as reducing whole volume without requiring insulation layers, reducing occupied area as folding two or more times, reducing workload of layering processes as reducing a component count of members to be layered, and suppressing positional variation of the folded opposite-two-stage single-layer quantum cell 23.

In the secondary battery 20C illustrated in FIG. 12, folding is performed in a state that the single-layer quantum cell having the positive electrode layer 2 faced downward is superposed on the single-layer quantum cell having the positive electrode layer 2 faced upward, as illustrated in FIG. 13. However, it is also possible to arrange a plurality of the single-layer quantum cells each cell having the positive electrode layer 2 faced upward and a plurality of the single-layer quantum cells each cell having the positive electrode layer 2 faced downward. For example, it is also possible to form a secondary battery adopting a structure of folding two or more times in a state that the single-layer quantum cells each cell having the positive electrode layer 2 faced upward are superposed into two stages and arranged at the lower side and the single-layer quantum cells each cell having the positive electrode layer 2 faced downward are superposed into two stages and arranged at the upper side so as to be superposed into four stages in total.

As long as being capable of being applied to the secondary battery 20C of the third embodiment, the modified embodiments appropriately described for the secondary batteries 20A, 20B of the abovementioned embodiments become to modified embodiments of the secondary battery 20C of the third embodiment. Here, detailed description thereof will not be repeated.

(E) Fourth Embodiment

Figure 14:
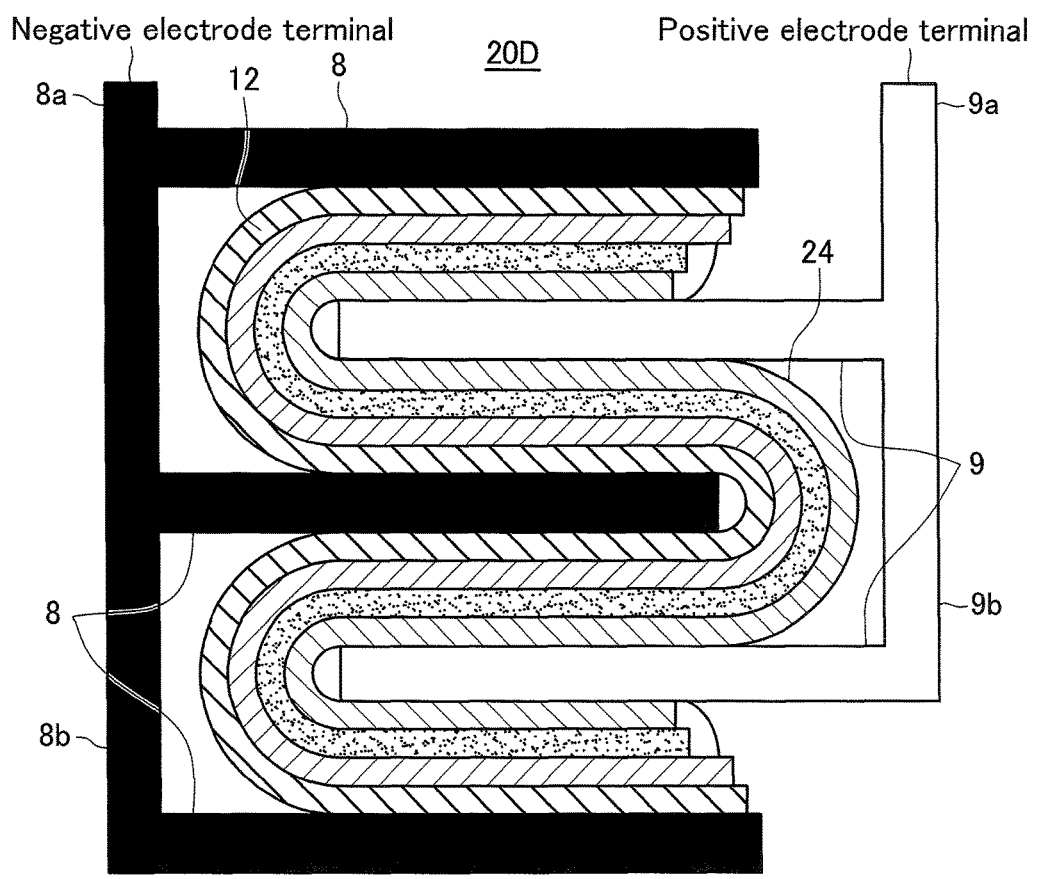
FIG. 14 is a sectional view illustrating a structure of a secondary battery according to a fourth embodiment.

Next a fourth embodiment of a secondary battery according to the present invention will be described with reference to the drawings. FIG. 14 is a sectional view illustrating a structure of a secondary battery 20D according to the fourth embodiment as viewing from the same direction as FIG. 4(B). In FIG. 14, dimensions in the thickness direction are more emphasized than those in the planar direction.

Each of the first to third embodiments described above adopts the folded single-layer quantum cell formed by folding the single-layer quantum cell (see FIG. 4) which includes the negative electrode layer 3, the charging layer 6, and the positive electrode layer 2. Here, the seal 7 is not an essential structural element. The single-layer quantum cell including the negative electrode layer 3, the charging layer 6, and the positive electrode layer 2 is formed on a base plate through a thin-film forming process, and then, separated from the base plate. Alternatively, the single-layer quantum cell is formed by being cut into a predetermined shape after being separated. For such a quantum cell, a thin conductive base plate formed of conductive material such as copper and stainless steel can be adopted as the abovementioned base plate as well as an insulation base plate.

The secondary battery 20D of the fourth embodiment is obtained by modifying a part of the secondary battery 20A (see FIG. 7) of the first embodiment. In the secondary battery 20D, a folded base-plate-included single-layer quantum cell 24 obtained by folding a unit structure (hereinafter, appropriately called a base-plate-included single-layer quantum cell) two or more times while alternately changing the folding direction is adopted instead of the folded single-layer quantum cell 21 of the secondary battery 20A of the first embodiment. Here, the unit structure denotes a structure that the negative electrode layer 3, the charging layer 6, and the positive electrode layer 2 are layered on a conductive base plate 12 and the seal 7 (not being an essential structural element) is arranged for short-circuit prevention. The rest of the structure is the same as the secondary battery 20A of the first embodiment.

According to the secondary battery 20D of the fourth embodiment, since the unit structure before being folded is the base-plate-included single-layer quantum cell, it is possible to eliminate a manufacturing process to separate a cell structural portion from the base plate. The rest of effects is the same as the first embodiment.

Since the folded base-plate-included single-layer quantum cell 24 includes the conductive base plate 12, the negative electrode layer 3 can be eliminated by causing the conductive base plate 12 to serve as the negative electrode layer 3 as well.

As long as being capable of adopting the technical idea of the secondary battery 20D of the fourth embodiment, the modified embodiments appropriately described for the secondary batteries 20A to 20C of the abovementioned embodiments become to modified embodiments of the secondary battery 20D of the fourth embodiment. Here, detailed description will not be repeated.

In the secondary battery 20D of the fourth embodiment, the folded single-layer quantum cell 21 of the secondary battery 20A of the first embodiment is replaced with the folded base-plate-included single-layer quantum cell 24. It is also possible to actualize a secondary battery (not illustrated) in which the single-layer quantum cell of the folded single-layer quantum cell 22, 23 in the secondary battery 20B, 20C of the second or third embodiment is replaced with the base-plate-included single-layer quantum cell.

In the secondary battery 20D illustrated in FIG. 14, the conductive base plate 12 is arranged at the negative electrode layer 3 side. Similarly, in a case that the conductive base plate 12 is arranged at the positive electrode layer 2 side, it is also possible to structure a secondary battery with the conductive base plate 12 remained.

(F) Fifth Embodiment

Figure 15A:
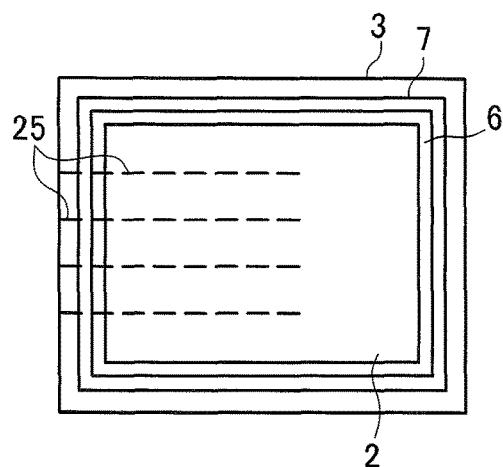
FIG. 15 is an explanatory view illustrating a structure of a secondary battery of a fifth embodiment adopting a first example of a tongue-piece-included folded single-layer quantum cell.
Figure 15B:
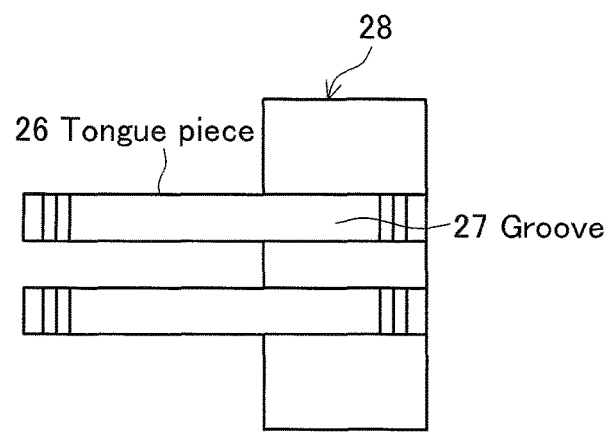
Figure 15C:
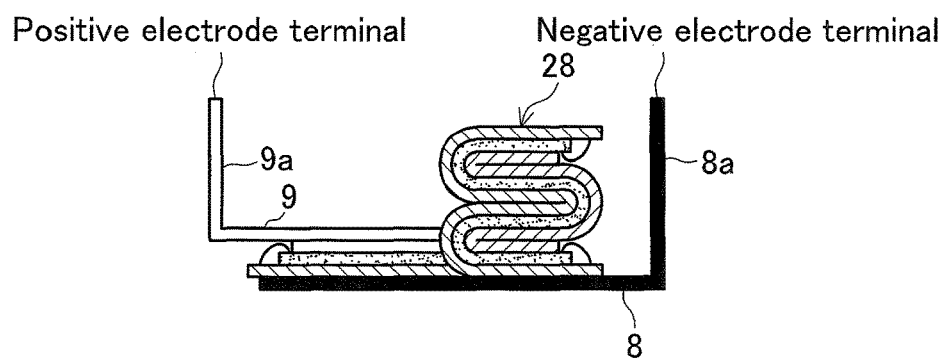

Next, a fifth embodiment of a secondary battery according to the present invention will be described with reference to the drawings. FIG. 15(C) is a front view illustrating a structure of a secondary battery 20E according to the fifth embodiment as viewing from the same direction as the sectional view of FIG. 4(B). In this front view, the seal 7 at the near side to be naturally seen is eliminated. In FIG. 15(C), dimensions in the thickness direction are more emphasized than those in the planar direction.

The secondary battery 20E according to the fifth embodiment is formed as follows, for example. First, as illustrated in a plane view of FIG. 15(A), one or a plurality of slits 25 extending to the vicinity of a folding line at which the first folding is performed are formed at a single-layer quantum cell (FIG. 15(A) illustrates an example of four slits). The slits 25 may be formed by cutting a completed single-layer quantum cell. Alternatively, the slits 25 may be formed, during a forming process of a single-layer quantum cell due to sequential forming of thin films, by disturbing film forming at regions where the slits 25 are to be formed. Next, as illustrated in a front view of FIG. 15(B), predetermined sections among sections separated by the slits 25 are folded predetermined number of times (FIG. 15 illustrates an example of three times) or more. FIG. 15 illustrates an example of folding the far-most section, a section between the second and third slits 25 from the far side, and the near-most section. Sections which are not folded form tongue pieces 26 extended from a folded accordion body when viewed as a whole after the folding. Extension sections from the tongue pieces 26 form grooves 27 in the accordion body. Hereinafter, a single-layer quantum cell 28 folded into an accordion shape having the tongue pieces 26 as illustrated in FIG. 15(B) are appropriately called a tongue-piece-included folded single-layer quantum cell.

In the following, even in a case that the tongue pieces and the grooves are not illustrated in the drawing used for description, there may be a case that references 26, 27 are used in the description.

Figure 16A:
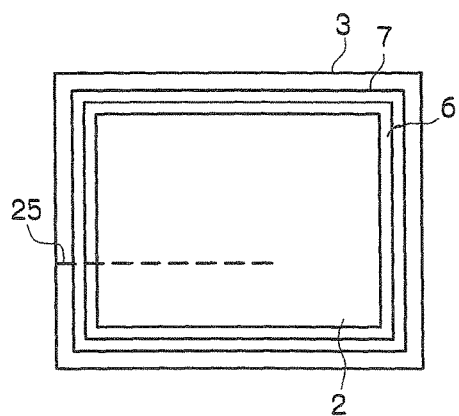
FIG. 16 is an explanatory view illustrating a structure of a second example of the tongue-piece-included folded single-layer quantum cell.
Figure 16B:
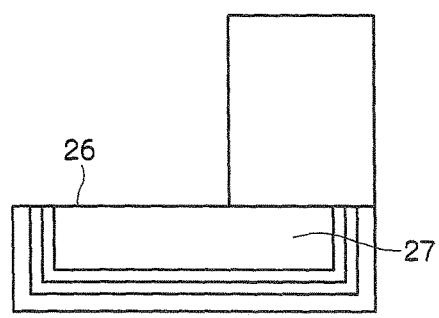
Figure 17A:
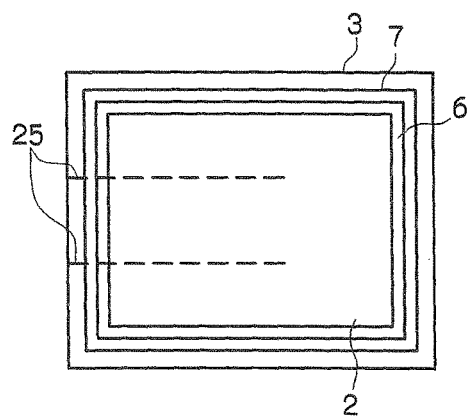
FIG. 17 is an explanatory view illustrating a structure of a third example of the tongue-piece-included folded single-layer quantum cell.
Figure 17B:
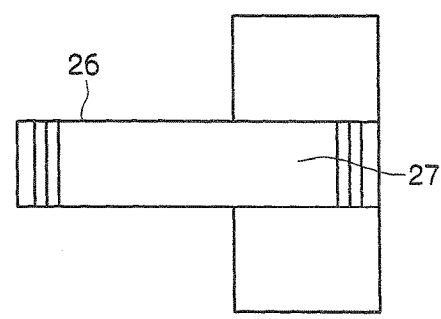

FIG. 16(B) illustrates a tongue-piece-included folded single-layer quantum cell in which a single tongue piece 26 and a groove 27 at the extension thereof are arranged at the near side. FIG. 16(A) illustrates a state of the tongue-piece-included folded single-layer quantum cell before being folded into an accordion shape. FIG. 17(B) illustrates a tongue-piece-included folded single-layer quantum cell in which a single tongue piece 26 and a groove 27 at the extension thereof are arranged at the center in the width direction. FIG. 17(A) illustrates a state of the tongue-piece-included folded single-layer quantum cell before being folded into an accordion shape.

As illustrated in FIGS. 15 to 17, in the tongue-piece-included folded single-layer quantum cell 28, the number of the tongue pieces 26 and the position thereof are not limited. Further, width of the tongue piece 26 is not limited as well. Length of the tongue piece 26 is determined in accordance with length of the slit 25. However, the tongue piece 26 may be cut along a direction perpendicular to the longitudinal direction thereof after folding into an accordion shape so as to be shorter than the length of the slit 25.

In the secondary battery 20E according to the fifth embodiment, the positive electrode terminal plate 9 is in contact at least with the positive electrode layer 2 at the tongue piece 26. Here, the positive electrode terminal plate 9 may be extended to be in contact with the positive electrode layer 2 which is exposed to the face of the groove 27. FIG. 15(C) illustrates such a case. The negative electrode terminal plate 8 is in contact, for example, with the negative electrode layer 3 at the lower side of a folded portion at the lowermost side in the accordion body (the negative electrode layer 3 at the tongue piece 26 on the extension thereof may be included) and the negative electrode layer 3 at the upper side of a folded portion at the uppermost side in the accordion body (such a negative electrode layer does not exist in a case that the number of folding times is even). The negative electrode terminal plate 8 and the positive electrode terminal plate 9 are connected respectively to the extension portions 8a, 9a for exposing the negative electrode terminal and the positive electrode terminal to the outside of a mounting member (not illustrated).

In FIG. 15, the tongue piece 26 is extended on the same plane as the lower folded portion of the accordion body. It is also possible that the tongue piece 26 is folded at an angle other than 180 degrees against the lower folded portion of the accordion body and the extending direction of the positive electrode terminal plate 9 is selected accordingly. Alternatively, it is also possible that the tongue piece 26 is bent at some midpoint and the leading end of the bent piece is contacted to the positive electrode terminal plate 9.

Figure 18:
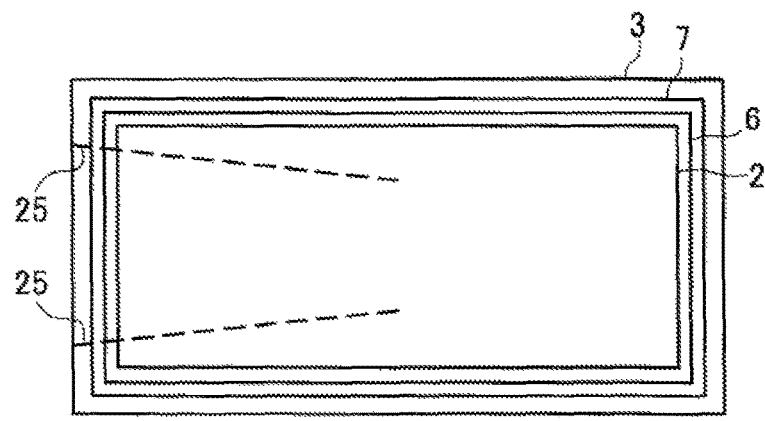
FIG. 18 is an explanatory view illustrating a structure of a fourth example of the tongue-piece-included folded single-layer quantum cell.

Further, FIG. 15 illustrates a case that the slits 25 intersect with folding lines as being perpendicular thereto. However, not limited to the above, the slits 25 and the folding lines may mutually intersect at an angle other than 90 degrees, for example, as illustrated in FIG. 18.

Figure 19:
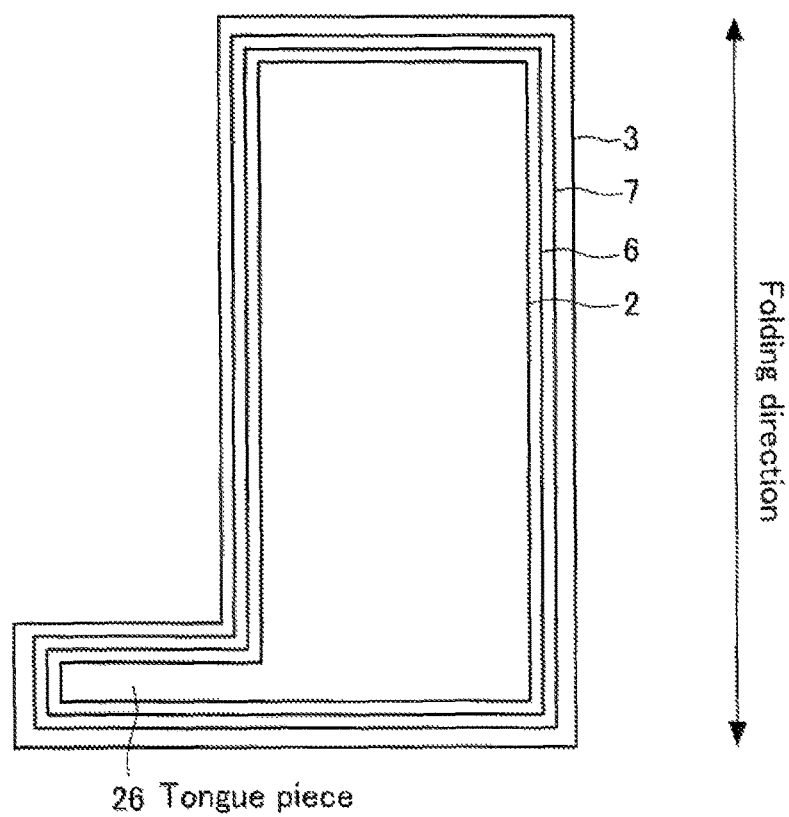
FIG. 19 is an explanatory view illustrating a structure of a fifth example of the tongue-piece-included folded single-layer quantum cell.

Further, FIG. 15 illustrates a case that the tongue-piece-included folded single-layer quantum cell 28 is formed by folding with the slits 25 formed. However, the tongue-piece-included folded single-layer quantum cell 28 may be formed in another way. For example, as illustrated in FIG. 19, the tongue-piece-included folded single-layer quantum cell 28 may be formed owing to that the single-layer quantum cell before being folded into an accordion shape is shaped to have the tongue piece 26 and that portions other than the tongue piece 26 are folded along the folding lines being in parallel to the longitudinal direction of the tongue piece 26. In this case, folding into an accordion shape may be performed so that a portion corresponding to the abovementioned groove 27 is formed or is not formed.

According to the secondary battery 20E of the fifth embodiment, since the tongue piece 26 is arranged, the positive electrode layer 2 can be also used as a structural element of a leading electrode and volume can be reduced by the electrode amount.

Effects of using the single-layer quantum cell which is folded into an accordion shape are the same as described for the abovementioned embodiments.

As long as being capable of being applied to the secondary battery 20E of the fifth embodiment, the modified embodiments appropriately described for the secondary batteries 20A to 20D of the abovementioned embodiments become to modified embodiments of the secondary battery 20E of the fifth embodiment. Here, detailed description thereof will not be repeated.

(G) Other Embodiments

A variety of modified embodiments are described in the description of the abovementioned embodiments. In addition, modified embodiments described in the following may be adopted.

(G-1) In the abovementioned modified example of the secondary battery 20A of the first embodiment, a plurality of the secondary batteries 20A are mounted in a single mounting member. Here, the plurality of secondary batteries to be mounted in the single mounting member may be secondary batteries of different embodiments described above. In this case, the extension portions 8a, 9a of the plurality of secondary batteries may be connected in series, connected in parallel, or connected in series-parallel. Alternatively, the extension portions 8a, 9a may be separately exposed to the outside. It is simply required to select secondary batteries to be connected in series, in parallel, or in series-parallel in accordance with desired terminal voltage and current capacity.

Figure 20:
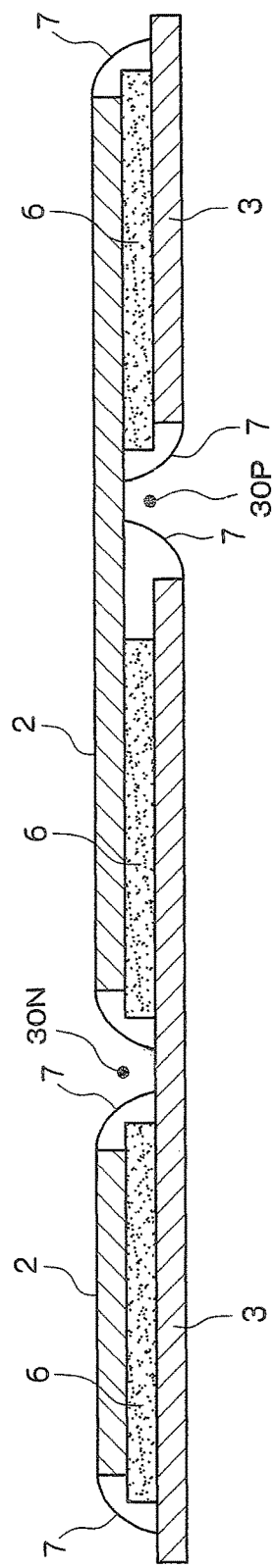
FIG. 20 is an explanatory view of a secondary battery of a first modified embodiment.

(G-2) In the abovementioned embodiments, any special consideration for being folded is not paid to the single-layer quantum cell (see FIG. 4). It is also possible to fold a single-layer quantum cell to which special consideration for being folded is paid. FIG. 20 is a sectional view of a single-layer quantum cell according to such a modified embodiment (see FIG. 4(B)). At belt-shaped sections 30P, 30N to be bent sections extended in the normal direction of the depiction of the drawing, only one of the positive electrode layer 2 and the negative electrode layer 3 (may be the negative electrode layer formed on the conductive base plate 12) is formed but the other thereof and the charging layer 6 are not formed, so that dynamic resistance against folding is reduced. In the case of the modified example, it is also possible to perform folding with a circular insulation rod member located at the belt-shaped sections which are concaved due to absence of the other electrode layer and the charging layer 6. Further, not illustrated in the drawings, even in a case that the negative electrode layer 3, the charging layer 6, and the positive electrode layer 2 are arranged on the folding line, it is also possible to form perforation along the folding line so that dynamic resistance against folding is reduced.

Figure 21:
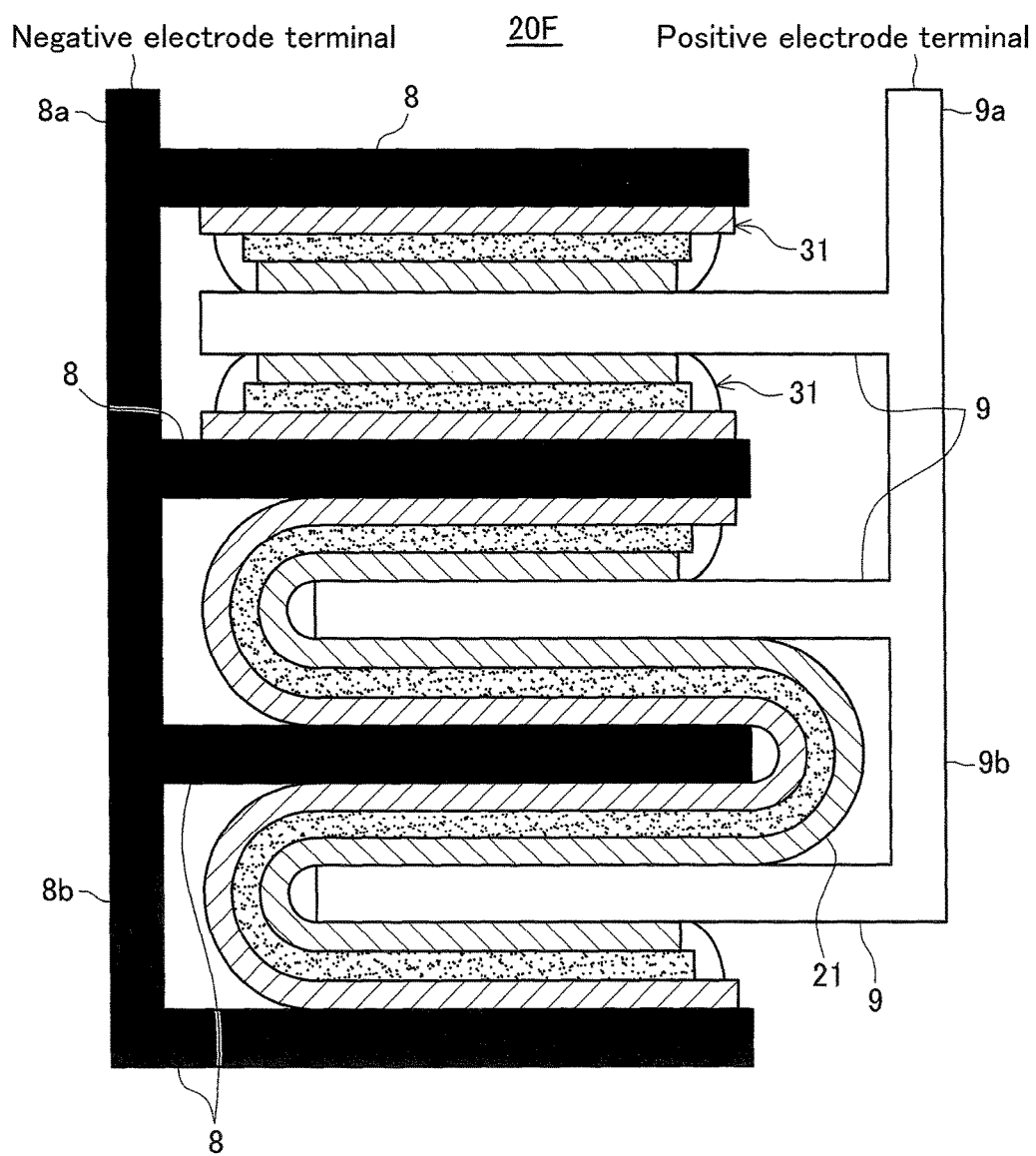
FIG. 21 is a sectional view illustrating a secondary battery of a second modified embodiment.
Figure 22:
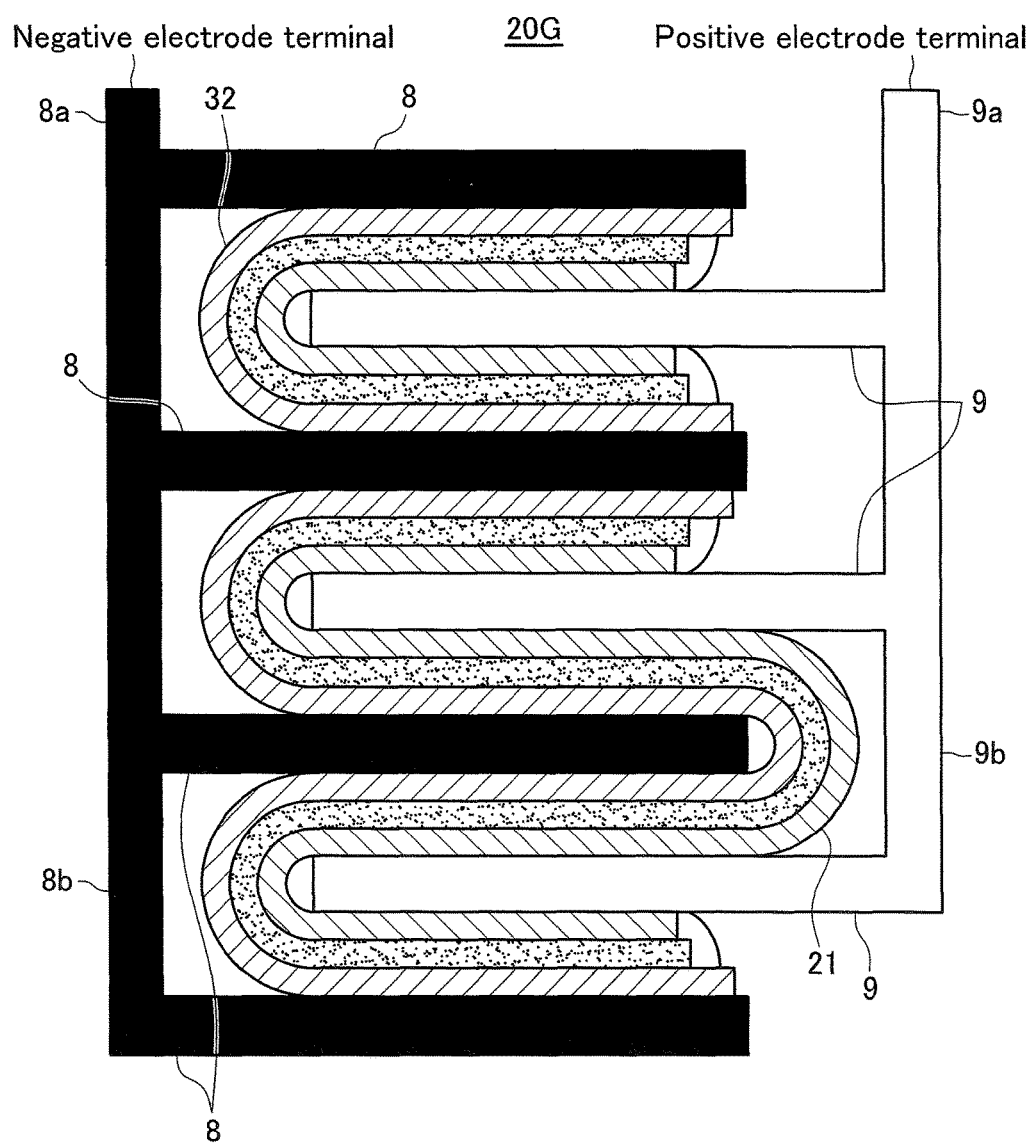
FIG. 22 is a sectional view illustrating a secondary battery of a third modified embodiment.

(G-3) Only the folded single-layer quantum cell obtained by folding a single-layer quantum cell two or more times is adopted in the abovementioned embodiments. However, a single-layer quantum cell having another structure may be adopted in addition to the above. FIGS. 21 and 22 are sectional views illustrating structures of secondary batteries 20F, 20G according to such modified embodiments.

The secondary battery 20F illustrated in FIG. 21 is a modified embodiment of the secondary battery illustrated in FIG. 8. Here, two single-layer quantum cells 31 are layered at the uppermost side with sides of the positive electrode layers 2 mutually faced. The positive electrode terminal plate 9 is arranged as being sandwiched between the mutually-faced positive electrode layers 2. Further, the negative electrode layers 3 of the two single-layer quantum cells 31 are in contact respectively with different negative electrode terminal plates 8. According to the structure that the single-layer quantum cell 31 having small area without being folded is adopted to be layered, even when defectiveness is detected at a single-layer quantum cell to be folded two or more times which is cut out from an original large sheet, a portion thereof, as long as being normal, can be used as the single-layer quantum cell 31 having small area for the secondary battery 20F.

The secondary battery 20G illustrated in FIG. 22 is a modified embodiment of the secondary battery illustrated in FIG. 8. Here, a folded single-layer quantum cell 32 obtained by folding a single-layer quantum cell in two with sides of the positive electrode layers 2 mutually faced is layered at the uppermost side. The positive electrode terminal plate 9 is arranged as being sandwiched between the mutually-faced positive electrode layers 2. Further, the negative electrode layers 3 at the upper and lower sides of the folded single-layer quantum cell 32 are in contact respectively with different negative electrode terminal plates 8. According to the structure that the single-layer quantum cell 32 folded in two is adopted to be layered, even when defectiveness is detected at a single-layer quantum cell to be folded two or more times which is cut out from an original large sheet, a portion thereof, as long as being normal, can be used as the folded single-layer quantum cell 32 for the secondary battery 20G.

(G-4) In the abovementioned embodiments, the normal direction of faces of the folded single-layer quantum cell is oriented in the vertical direction. However, it is also possible that the normal direction of the faces of the folded single-layer quantum cell is oriented in the lateral direction (e.g., a secondary cell in a state that FIG. 7 is rotated counterclockwise or clockwise by 90 degrees).

(G-5) In the abovementioned embodiments, the single-layer quantum cell is folded so that each folded portion has the same width. However, not every folded portion is required to have the same width.

(G-6) In the abovementioned embodiments, the single-layer secondary cell is structured as a quantum cell. However, not limited to a quantum cell, it is simply required to adopt a secondary cell having a sheet shape (parallel flat plate shape). For example, as long as being capable of being folded, a solid-state lithium ion secondary cell may be layered in the abovementioned embodiments.

The invention claimed is:

1. A secondary battery, comprising a plurality of single-layer secondary cells each formed by folding a sheet-shaped single-layer secondary cell, with a storage layer sandwiched between a positive electrode layer and a negative electrode layer, the storage layer being arranged to store electrons during a charging operation and to release the stored electrons during a discharging operation,
wherein the secondary battery is arranged by superposing the plurality of single-layer secondary cells and folding the superposed plurality of single-layer secondary cells two or more times while alternately reversing the folding direction in a multistage manner to form a folded multistage single layer secondary cell with a top and a bottom of each cell oriented in a same direction,
wherein a positive electrode terminal member is inserted into a space between mutually-facing sections of a respective positive electrode layer of one of the single-layer secondary cells, and a leading end of the positive electrode terminal member extends to a bent section of the respective positive electrode layer,
wherein a negative electrode terminal member is inserted into a space between mutually-facing sections of a respective negative electrode layer of at least one of the single-layer secondary cells, and a leading end of the negative electrode terminal member extends to a bent section of the respective negative electrode layer, and
wherein each storage layer is an n-type metal oxide semiconductor and each positive electrode layer comprises a p-type metal oxide semiconductor layer formed to be in contact with a respective electrode main body layer and a respective storage layer.

2. The secondary battery according to claim 1,
wherein each single-layer secondary cell includes a non-folded portion which is not folded, and
at least one of the positive electrode layer and the negative electrode layer at the non-folded portion is in contact with a positive electrode terminal member or a negative electrode terminal member.

3. The secondary battery according to claim 1,
wherein, in the single-layer secondary cell, the negative electrode layer or the positive electrode layer is formed on a conductive base plate.

4. A secondary battery, comprising a plurality of single-layer secondary cells each formed by folding a sheet-shaped single-layer secondary cell, with a storage layer sandwiched between a positive electrode layer and a negative electrode layer, the storage layer being arranged to store electrons during a charging operation and to release the stored electrons during a discharging operation,
wherein a folded multistage single-layer secondary cell is arranged by superposing the plurality of single-layer secondary cells and folding the superposed plurality of single-layer secondary cells two or more times while alternately reversing the folding direction in a multistage manner with a top and a bottom of at least one of the superposed single layer secondary cells oriented in a first direction and a top and a bottom of at least one other of the superposed single-layer secondary cells oriented in a second direction which is opposite to the first direction,
wherein one of a positive electrode terminal member and a negative electrode member is inserted into a space between mutually-facing sections of the respective positive or negative electrode layers of two of the single-layer secondary cells, and a leading end of the positive electrode terminal member or the negative electrode member extends to bent sections of the respective positive or negative electrode layers,
wherein the other of the positive electrode terminal member and the negative electrode terminal member is inserted into a space between mutually-facing sections of a respective positive electrode layer or negative electrode layer of one of the two single-layer secondary cells, and a leading end of the positive electrode terminal member or negative electrode terminal member extends to a bent section of the respective positive electrode layer or negative electrode layer of the one of the two single-layer secondary cells, and
wherein each storage layer is an n-type metal oxide semiconductor and each positive electrode layer comprises a p-type metal oxide semiconductor layer formed to be in contact with a respective electrode main body layer and a respective storage layer.

5. The secondary battery according to claim 4,
wherein the folded multistage single-layer secondary cell includes a non-folded portion which is not folded, and
at least one of the positive electrode layer and the negative electrode layer at the non-folded portion is in contact with a positive electrode terminal member or a negative electrode terminal member.

6. The secondary battery according to claim 4,
wherein, in the single-layer secondary cell, the negative electrode layer or the positive electrode layer is formed on a conductive base plate.

* * * * *